(12) United States Patent
Brown

(10) Patent No.: US 8,056,335 B1
(45) Date of Patent: Nov. 15, 2011

(54) SMA ACTUATOR

(76) Inventor: James Holbrook Brown, Costa Mesa, CA (US)

( * ) Notice: Subject to any disclaimer, the term of this patent is extended or adjusted under 35 U.S.C. 154(b) by 731 days.

(21) Appl. No.: 12/069,279

(22) Filed: Feb. 8, 2008

Related U.S. Application Data

(60) Provisional application No. 60/901,257, filed on Feb. 15, 2007.

(51) Int. Cl.
*F01B 29/10* (2006.01)

(52) U.S. Cl. .............................. 60/528; 60/529

(58) Field of Classification Search ............. 60/527–529
See application file for complete search history.

(56) References Cited

U.S. PATENT DOCUMENTS

| | | | | |
|---|---|---|---|---|
| 4,524,343 A | * | 6/1985 | Morgan et al. | 337/140 |
| 4,556,935 A | * | 12/1985 | Lemme | 362/279 |
| 5,771,742 A | * | 6/1998 | Bokaie et al. | 74/2 |
| 2008/0022674 A1 | * | 1/2008 | Brown et al. | 60/527 |

* cited by examiner

*Primary Examiner* — Hoang Nguyen
(74) *Attorney, Agent, or Firm* — Calfee, Halter & Griswold LLP

(57) ABSTRACT

A shape memory alloy actuated device is provided for engaging a movable object. The device may include a first movable component, a shape memory alloy for moving the first component from a first position to a second position, a biasing element configured to expand the shape memory alloy object and apply a continual tensile force to the shape memory alloy object. The device may be configured to allow the first component move between the first position and the second position other than by transferring force to the shape memory alloy object. The device may also be configured to allow the shape memory alloy object to expand and contract when the first component is retained in the first position.

20 Claims, 4 Drawing Sheets

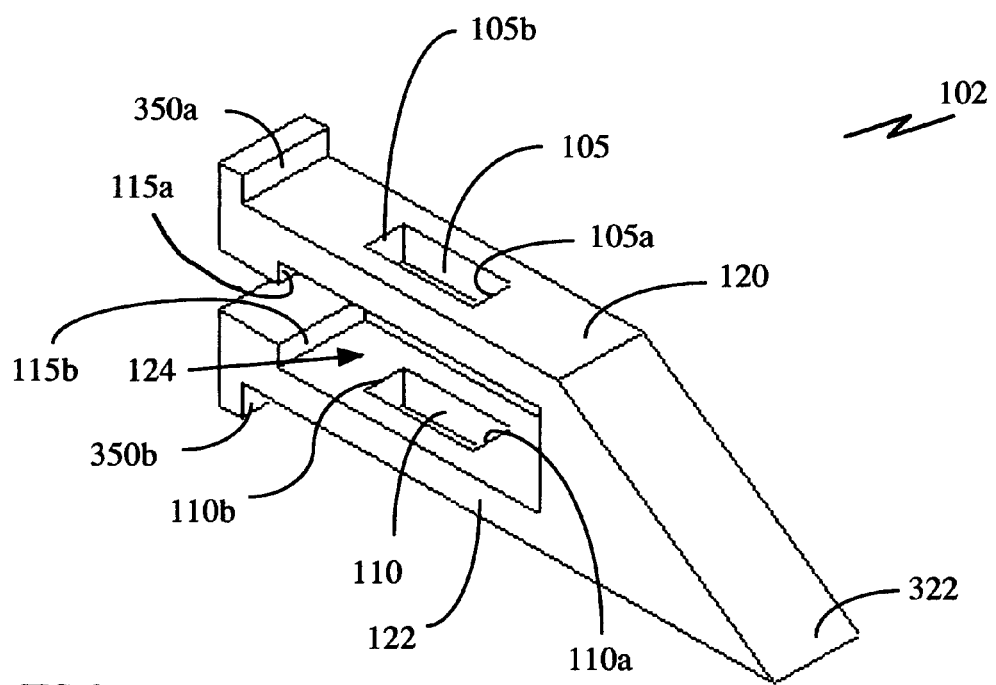
FIG. 2.
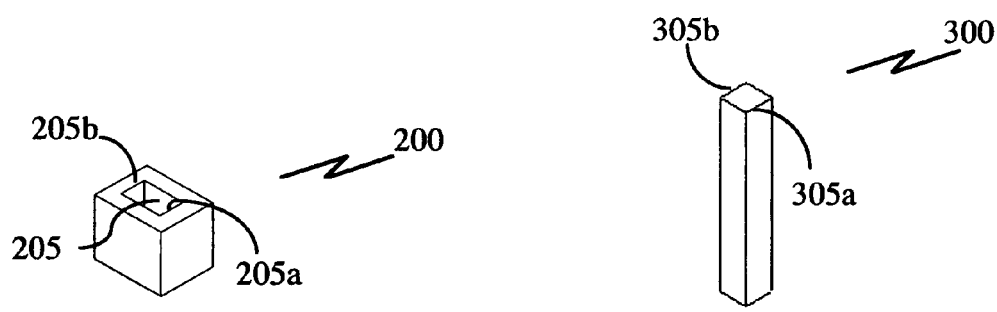
FIG. 3.
FIG. 4.

SMA ACTUATOR

RELATED APPLICATIONS

This application claims the claims priority to, and any other benefit of, U.S. Provisional Patent Application Ser. No. 60/901,257 filed Feb. 15, 2007, the entire disclosure of which is fully incorporated herein by reference.

BACKGROUND

Shape memory alloys (SMAs) are metallic alloys that may recover apparent permanent strains when they are heated above a certain temperature. SMAs have two stable states or phases; a hot or austenite state and a cold or martensite state.

In the austenite state, the alloy is hard and rigid, while in the martensite state, the alloy is softer and flexible. In the martensite state, the SMA may be stretched or deformed by an external force. Upon heating, the SMA will return to its austenite state and contract or recover any reasonable stretch that was imposed on it. Thus, the SMA recovers with more force than was required to stretch it out. This exerted force upon contraction may be used to perform any number of tasks such as, but not limited to, turning a device on or off, opening or closing a device or object, or actuating a device or object.

A variety of problems, however, may occur when an SMA is incorporated in a device to perform one or more of these tasks. For example, SMAs can be damaged if they are inhibited from contracting when heated above their working range of austenite temperatures. In addition, abrupt loading of an SMA, such as short, high peaks of force, can also damage and reduce the longevity of an SMA. For example, an SMA actuator may be used to actuate a latch for a door or a lid. Typically, when the door or lid is closed, it pushes the latch out of the way. Once the door clears the latch, the latch will snap back into position and hold the door closed. Snapping back into position can jerk the SMA, causing a short high peak of force that damages the SMA. Additionally, an SMA that is used in an actuated devices that has two or more positions can droop and become caught or entangled in other parts of the device when the SMA is cooled and elongated but is not stretched taut or placed under tension.

SUMMARY OF THE INVENTION

In an illustrated embodiment of a device applying at least some of the principles of the invention, an SMA actuated device is disclosed. The SMA actuated device may include a feature that keeps continual tension on the SMA object when the SMA object is in both an austenite state and a martensite state. The SMA actuated device may also include a feature adapted to avoid the SMA object being inhibited from contracting when heated above its austenite transition temperature. The SMA actuated device may also include a feature that isolates the SMA object from forces resulting from the movement of another device component. Various embodiments of the SMA actuated device may include any one or more of these features.

In one embodiment a shape memory alloy actuated device is provided for engaging a movable object. The device may include a housing, a first component movable between a first position and a second position relative to the housing where the first component has a first end adapted to engage the movable object when the first component is in the first position. The device may also include a shape memory alloy object for moving the first component from the first component first position to the first component second position, wherein the shape memory alloy object is adapted to expand to a SMA first position and contract to a SMA second position as a function of temperature. A first biasing element may be configured to expand the shape memory alloy object to the SMA first position and apply a tensile force to the shape memory alloy object when the shape memory alloy is in both the SMA first position and the SMA second position. The device may be configured to allow the first component to move between the first component first position and the first component second position other than by transferring force to the shape memory alloy object. The device may also be configured to allow the shape memory alloy object to expand to the SMA first position and contract to the SMA second position when the first component is retained in the first component first position.

BRIEF DESCRIPTION OF THE DRAWINGS

In the accompanying drawings, which are incorporated in and constitute a part of the specification, embodiments of the invention are illustrated, which, together with the detailed description given below, serve to exemplify embodiments of the invention:

FIG. 2 is a perspective view a first movable component of the device of FIG. 1;

FIG. 3 is a perspective view the second movable component of the device of FIG. 1;

FIG. 4 is a perspective view of the third movable component of the device of FIG. 1;

DETAILED DESCRIPTION

While various aspects and concepts of the invention are described and illustrated herein as embodied in combination in the embodiments, these various aspects and concepts may be realized in many alternative embodiments, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices, and so on may be described herein, such descriptions are not intended to be a complete or exhaustive list of available alternative embodiments, whether presently known or identified herein as conventional or standard or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated. Still further, representative values and ranges may be included to assist in understanding the present invention however, such values and ranges are not to be construed in a limiting sense and are intended to be critical values or ranges only if so expressly stated. The embodiments described in the summary and throughout the specification are not intended to limit the meaning or scope of the claims in any way. The terms used in the claims have all of their full ordinary meaning.

Further, the terms upper, lower, top, bottom, front, back, upward, and downward are merely references that may be used herein for convenience of explanation and form no structural or use limitation or reference for the invention.

Figure 1:
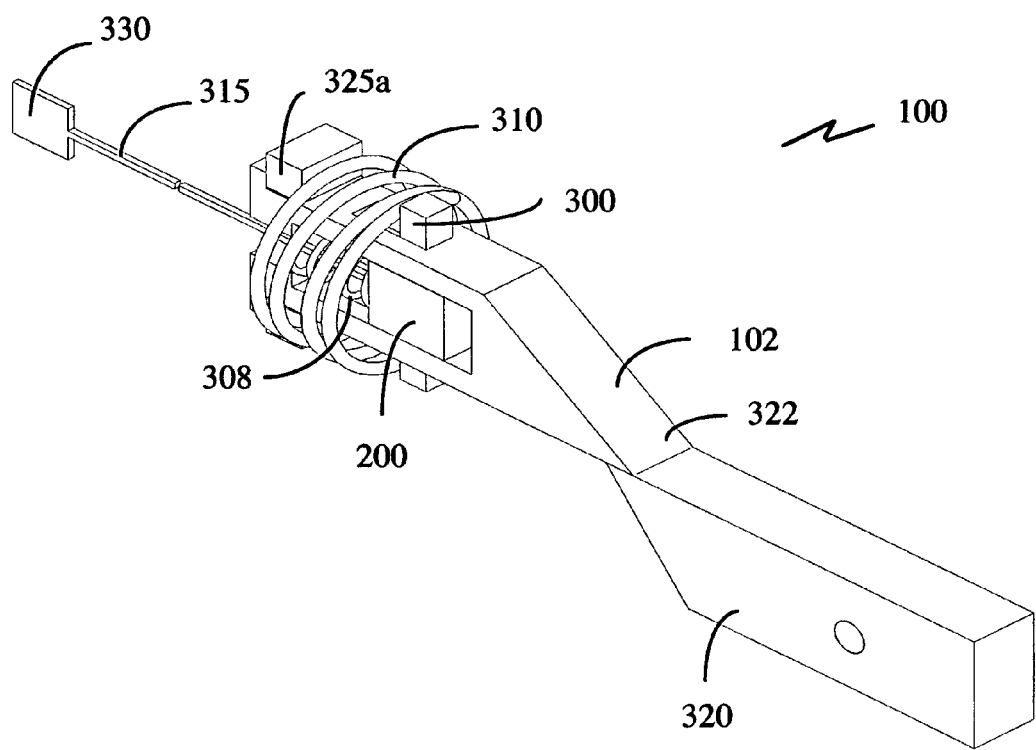
FIG. 1 is a perspective view of an exemplary embodiment of an SMA actuated device as disclosed in the application.

FIG. 1. illustrates an exemplary embodiment of an assembled SMA actuated device 100 as disclosed in the application. The SMA actuated device 100 is adapted to engage a movable object 320. The SMA actuated device 100 includes an SMA object 315, a retaining member 325a that may be, for example but not limited to, a portion of a housing, a separate component attached to a housing, a first movable component 102, a second movable component 200, a third movable component 300, a first bias element 308, and a second bias element 310.

FIG. 2 illustrates an exemplary embodiment of the first movable component 102. The first movable component may be configured in a variety of way. Any structure capable of being moved by an SMA object and capable of engaging a movable object to move, hold or restrict movement of a movable object may be used. In the depicted embodiment, the first movable component 102 is realized as a latch. The first movable component 102 has a tip 322 at one end to engage, lock or hold the movable object 320. The movable object 320 may be any object that is desired to be held or retained in one position, such as but not limited catch on a door or lid.

The exemplary first movable component 102 shown has a generally u-shaped structure with an open cavity and multiple slots and surfaces. The first movable component 102 has a first wall 120 and a second wall 122 extending away from the tip 322 and defining a space or cavity 124 in between. In the depicted embodiment, the first wall 120 and the second wall 122 may extend generally parallel to each other. The first wall 120 has a first opening or slot 105 with a first surface 105a and a second surface 105b. The second wall 122 has a second opening or slot 110 with a first surface 110a and a second surface 110b. The first wall 120 and the second wall 122 includes first retaining surfaces 115a, 115b and second retaining surfaces 350a, 350b that are generally perpendicular to the first wall and second wall.

FIG. 3 illustrates an exemplary embodiment of the second movable component 200. The second movable component may be configured in a variety of ways. Any suitable structure capable of attaching to the SMA object to be moved by the SMA object relative to the housing may be used. In the depicted embodiment, the second movable component 200 is realized as a block shaped structure having an opening or slot 205 that extends through the component. The opening or slot 205 has a first surface 205a and a second surface 205b. The opening or slot 205 is adapted to receive the exemplary third movable component 300.

FIG. 4 illustrates an exemplary embodiment of the third movable component 300. The third movable component 300 may be configured in a variety of ways. Any suitable structure capable of being received in the opening of the second movable component for movement therewith may be used. Thus, other structures movable with respect to the second movable component and engageable therewith may be used. In the depicted embodiment, the third movable component 300 is formed as a generally rectangular prism having a first surface 305a and a second surface 305b. The third movable component 300, however, may be any suitable shape, such as for example, a cylindrical rod.

Figure 5:
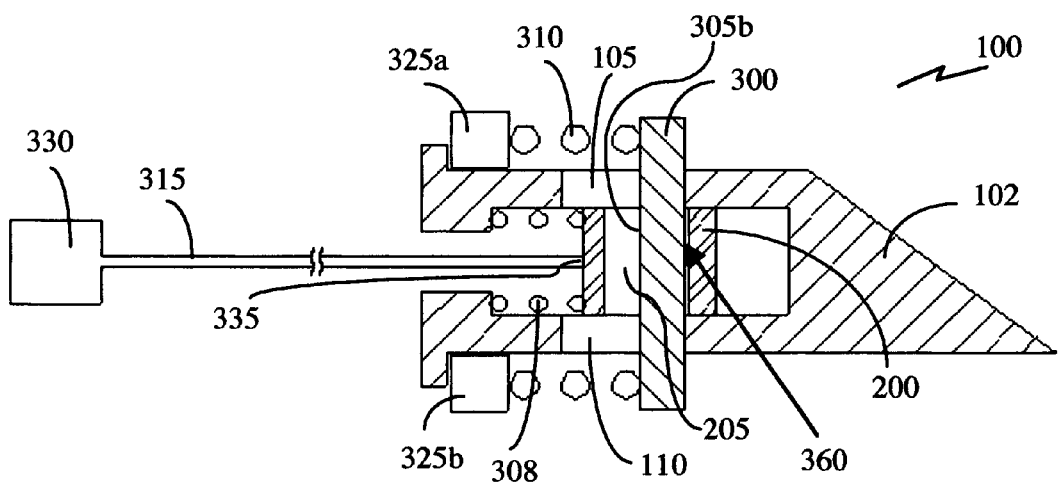
FIG. 5 is a close up cross-sectional view of the SMA actuated device of FIG. 1.

Referring to FIGS. 2 and 5, the SMA actuated device 100 is assembled such that the second movable component 200 is placed into the space or cavity 124 of the first movable component 102 such that the opening or slot 205 is generally aligned with the opening 105 in the first wall 120 and the opening 110 in the second wall 122. The third movable component 300 is received through the generally aligned openings 105, 205 and 110. The first biasing element 308 is positioned within the space 124 between the first retaining surfaces 115a, 115b and the second movable component 200. The second biasing element 310 is positioned around the first movable component 102 between the retaining portions 325a 325b and the second surface 305b of the third movable component 300. In the described embodiment the biasing elements are represented as springs, with the second biasing element 310 being stronger or stiffer than the first biasing element 308. Any object, however, that provides a biasing force may be used.

The SMA object 315 has a first end 335 attached to the second movable component 200 and a second fixed end 330. The second fixed end 330 of the SMA object 315 and the retaining portions 325a, 325b do not move with respect to the other components of the SMA actuator (i.e. the other components such as the first, second, and third movable components move relative to the second fixed end 330 and the fixed retaining portions 325a, 325b). The second fixed end 330 and the retaining portions 325a, 325b may be fixed to a housing or any other non-moving component. The retaining portions 325a, 325b may be integrally formed with a housing.

Figure 6:
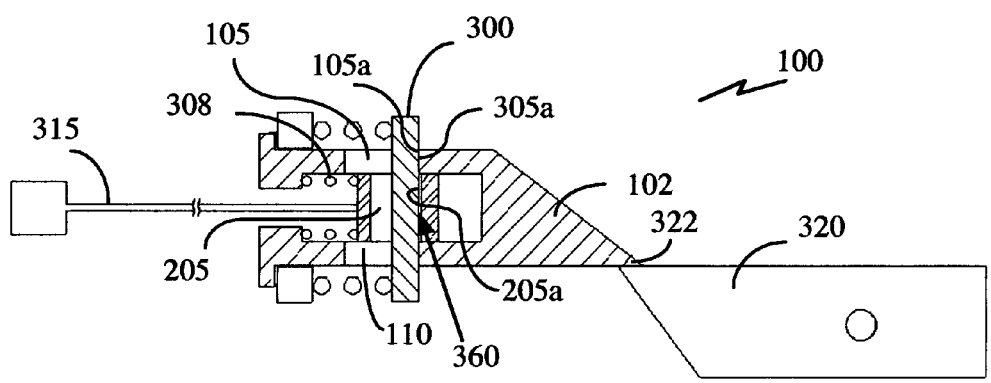
FIG. 6 is a cross-sectional view of the SMA actuated device of FIG. 1 in the latched position.

FIG. 6. shows the SMA actuated device 100 in a latched position. The movable object 320 is in a first position, for example, a catch on a door that is closed. The first movable component 102 is in a first position in which the tip 322 holds the movable object 320 in the first position. The first biasing element 308 is biasing the second movable component 200 to its respective first position. The first biasing element 308 is also expanding or elongating the SMA object 315 such that the first end 335 of the SMA object is in its first position. The second biasing element 310 is biasing the third movable component 300 to its first position. When the second movable component 200 and the third movable component 300 are in their respective first positions, there is a small gap 360 between the surface 305a on the third movable component and the surface 205a on the second movable component 200 and the surfaces 305a on the third movable component and the surface 105a on the first movable member 102 touch, thus holding the first movable member 102 in a position that engages the movable object 320 to keep the movable object in its first position (e.g. keeps a door closed and latched).

Figure 7:
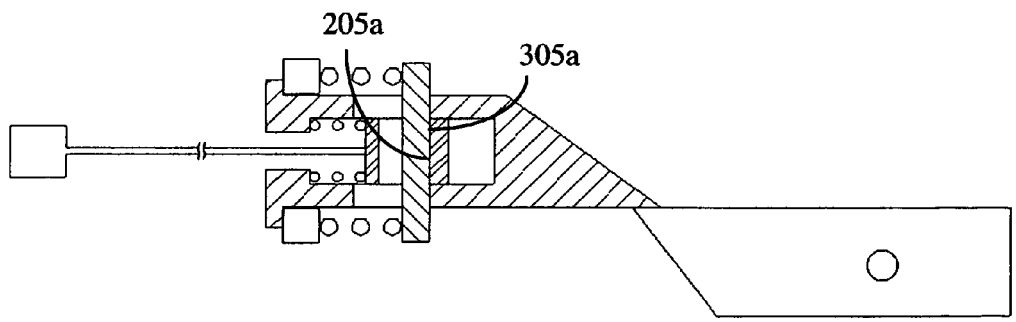
FIG. 7 is a cross-sectional view of the SMA actuated device of FIG. 1 during the SMAs initial contraction.

Referring to FIG. 7, as the SMA object 315 is heated to its austenite start temperature and begins to contract, the SMA object will pull the second movable component 200 toward the fixed end 330 of the SMA object. As a result, the gap 360 between the surface 205a on the second movable component 200 and the surface 305a of the third movable component will close and the two components will come into contact. The SMA object 315 may be heated to its austenite temperature in a variety of ways. For example, an electric power source (not shown), such as for example, a battery or an electric main, may be placed in circuit communication with the SMA object 315 in a manner that allows the power source to send an electric current through the SMA object. A control unit may control the application of the electric current through the SMA object. Other means of heating the SMA object, such as heating the air surrounding the SMA object, may be used.

Figure 8:
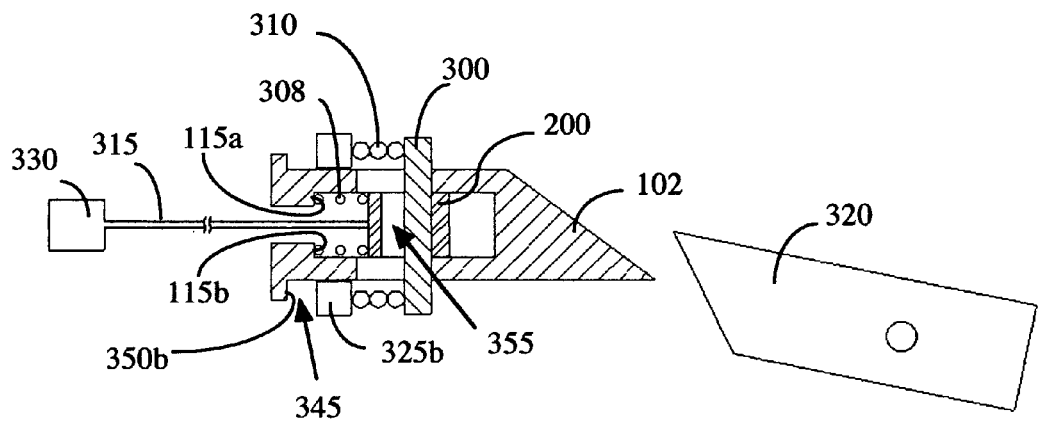
FIG. 8 is a cross-sectional view of the SMA actuated device of FIG. 1 in the unlatched position.

Referring to FIG. 8, as the SMA object 315 continues to contract, it continues to pull the second movable component 200 toward the fixed end 330 of the SMA object, which also pulls the third movable component 300 toward the fixed end 330 and compresses the second biasing element 310. As a result of the force from the SMA object 315 compressing the second biasing element 310 and pulling the second movable component and third movable component toward the fixed end 330 of the SMA object, the first biasing element 308 pushes the first movable component 102 toward the fixed end 330 of the SMA object. In FIG. 8, the first movable component 102, the second movable component 200, the third movable component 300 and the SMA object are illustrated in their respective second positions. Moving the first movable component 102 from the first component first position to the first component second position disengages or releases the movable object 320. In the depicted embodiment, the movable object 320 is a catch for a door that is spring loaded such that when the first movable component is moved toward the second position, the movable object automatically opens. The movable object, however, does not have to be spring loaded. For example, the first movable component could simply unlock the door. After unlatching, the device 100 may return to the position illustrated in FIG. 6 (i.e. the components are returned to their respective first positions).

Figure 9:
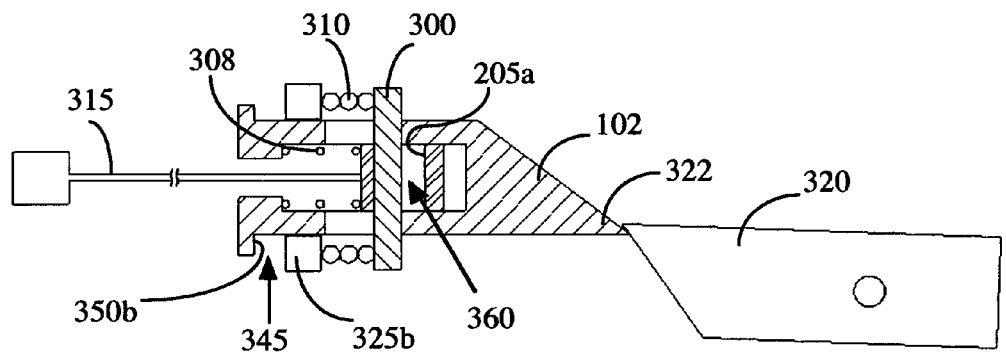
FIG. 9 is a cross-sectional view of the SMA actuated device of FIG. 1 illustrating the anti jerk and tensioning feature.

FIG. 9 illustrates the SMA actuated device 100 when the first movable component 102 and the third movable component 300 are in their respective second positions but the second movable component and the SMA object are in their respective first positions. This may occur, for example, when the SMA actuated device 100 is initially in the position illustrated in FIG. 5 and an external force acts on the first movable component 102 to move the first component second position. For example, in an embodiment in which the first movable member is a door latch, when the door is closed, the door may engage and force the latch toward the second position as the door closes. As the movable object 320 pushes the first movable member 102, the second biasing element 310 is compressed by the third movable component 300 and a gap 345 is formed between the retaining portion 325b and retaining surface 350b on the first movable component 102 and a gap 355 is formed between the surface 205a on the second movable component 200 and the surface 305a on the third movable component. As illustrated in FIG. 9, even though the SMA object is in an expanded position (i.e. a martensite state in which the SMA object is softer and flexible), the first biasing element 308 applies a tensile force to the SMA object to avoid slack in the SMA object becoming caught or entangled in other parts of the device. The first biasing element 308, for example, may be configured to keep the SMA object 315 taut when the SMA object is in the first SMA position. Thus, the first biasing element 308 provides a tensioning feature to the device 100.

When the movable object 320 clears the tip 322 of the first movable component 102, the second bias element 310 biases the first movable component back to the first component first position (FIG. 6). The first movable component 102 may return quickly or snap back to the first position. However, due to the gap 355 (FIG. 9) and the gap 360 (FIG. 6), the first movable component 102 and the third movable component 300 return to their respective first positions, without transferring force to or jerking the SMA object 315. Thus, the SMA actuated device has an anti-jerk feature that protects the SMA object 315 and allows the first movable component to move between the first component first position and the first component second position other than by transferring force to the SMA object.

Figure 10:
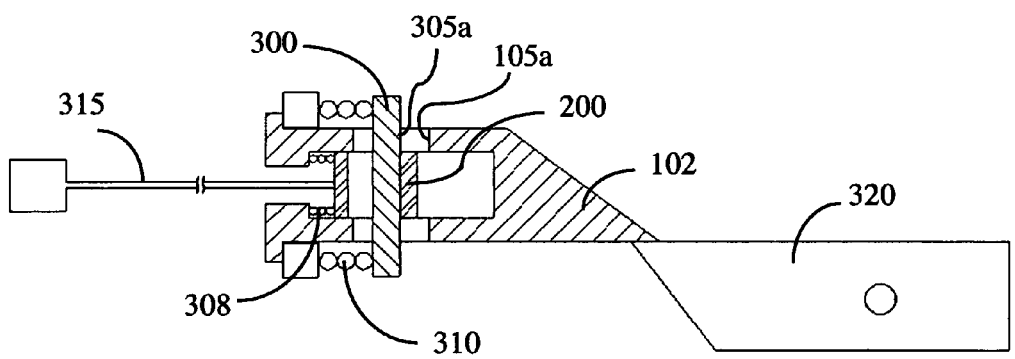
FIG. 10. is a cross-sectional view of the SMA actuated device of FIG. 1 when the strain relief is engaged.

FIG. 10. illustrates the SMA actuated device 100 when the first movable component 102 is in the first component first position and the SMA object 315, the second movable component 200, and the third movable component 300 are in their respective second positions. This may occur, when the first movable object is held or stuck in the first position. If the SMA object 315 is actuated, the SMA object will pull the second movable component 200 and the third movable component 300 to their respective second positions. As a result, both the first biasing element 308 and the second biasing element 310 are compressed and the surface 305a on the third movable component 300 separates from the surface 105a on the first movable component. The SMA object 315, therefore, can expand to the SMA first position and contract to the SMA second position when the first movable component 315 is retained in the first component first position. Thus, the SMA actuated device 100 has a strain relief feature that avoids damage to the SMA object 315 that could result from the SMA object being inhibited from contracting when heated above its austenite transition temperature.

The invention has been illustrated by the above description of embodiments, and while the embodiments have been described in some detail, it is not the intent of the applicants to restrict or in any way limit the scope of the invention to such detail. Additional advantages and modifications will readily appear to those skilled in the art. Therefore, the invention in its broader aspects is not limited to the specific details, representative apparatus and methods, and illustrative examples shown and described. Accordingly, departures may be made from such details without departing from the spirit or scope of the applicants' general or inventive concept. The embodiments described in the summary and throughout the specification are not intended to limit the meaning or scope of the claims in any way. The terms used in the claims have all of their full ordinary meaning.

The invention claimed is:

1. A shape memory alloy actuated device for engaging a movable object, comprising:
  a housing;
  a first component movable between a first position and a second position relative to the housing, the first component having a first end adapted to engage the movable object when the first component is in the first position;
  a shape memory alloy object for moving the first component from the first component first position to the first component second position, wherein the shape memory alloy object is adapted to expand to a SMA first position and contract to a SMA second position as a function of temperature; and
  a first biasing element configured to expand the shape memory alloy object to the SMA first position and apply a tensile force to the shape memory alloy object when the shape memory alloy is in both the SMA first position and the SMA second position; and
  wherein the first component is movable between the first component first position and the first component second position other than by transferring force to the shape memory alloy object;
  wherein the shape memory alloy object has a first end attached to a second component and a second end fixed relative to the housing, wherein the shape memory alloy moves the second component from a second component first position and a second component second position relative to the housing when the shape memory alloy object contracts to the SMA second position:
  wherein movement of the second component from a second component first position to a second component second position moves a third component movable from a third component first position and a third component second position relative to the housing; and
  wherein the second component is spaced apart from the third component when the second component and the third component are in their respective first positions.

2. The shape memory alloy actuated device of claim 1 wherein the shape memory alloy object can expand to the SMA first position and contract to the SMA second position when the first component is retained in the first component first position.

3. The shape memory alloy actuated device of claim 1 wherein the first biasing element keeps the shape memory alloy object taut in both the SMA first position and the SMA second position.

4. The shape memory alloy actuated device of claim 1 wherein the first biasing element biases the first component to the first component second position.

5. The shape memory alloy actuated device of claim 1 wherein the first bias element biases the second component to the second component first position.

6. The shape memory alloy actuated device of claim 1 further comprising a second biasing element configured to bias the third component toward the third component first position.

7. The shape memory alloy actuated device of claim 1 wherein the shape memory alloy object moves the second component and the third component to their respective second positions when the shape memory alloy object transitions from the SMA first position to the SMA second position.

8. A shape memory alloy actuated device for engaging a movable object, comprising:
  a housing;
  a first component movable between a first position and a second position relative to the housing, the first component having a first end adapted to engage the movable object when the first component is in the first component first position, a first wall having a first opening, and a second wall having a second opening, the first wall and the second wall arranged to define a space therebetween;
  a second component movable between a second component first position and a second component second position relative to the housing, the second component disposed within the space between the first wall and the second wall of the first component, the second component having an opening extending through the second component;
  a third component movable between a third component first position and a third component second position relative to the housing, the third component extending through the first opening in the first wall, through the opening in the second component, and through the opening in the second wall;
  a shape memory alloy object having a first end attached to the second component and a second end fixed relative to the first component, the shape memory alloy object adapted to expand to a SMA first position and contract to a SMA second position as a function of temperature;
  a first biasing element adapted to bias the second component to the second component first position,
  wherein the first component is movable between the first component first position and the first component second position other than by transferring force to the shape memory alloy object; and
  wherein the shape memory alloy object can contract to the SMA second position when the first component is retained in the first component first position.

9. The device of claim 8 wherein the first biasing element applies a tensile force to the shape memory alloy object when the shape memory alloy is in both the SMA first position and the SMA second position.

10. The device of claim 9 wherein the tensile force applied by the first biasing element keeps the shape memory alloy object taut in both the SMA first position and the SMA second position.

11. The device of claim 8 wherein the first biasing element is disposed between the second component and a first abutment surface on the first component.

12. The device of claim 8 wherein the first wall extends generally parallel to the second wall.

13. The device of claim 8 further comprising a second biasing element adapted to bias the third component to the third component first position.

14. The device of claim 13 wherein the second biasing element is disposed between the third component and a second abutment surface on the first component.

15. A shape memory alloy actuated device for engaging a movable object, comprising:
  a housing;
  a first component movable between a first position and a second position relative to the housing, the first component having a first end adapted to engage the movable object when the first component is in the first component first position, a first wall having a first opening, and a second wall having a second opening, the first wall extending generally parallel to the second wall to define a space therebetween;
  a second component movable between a second component first position and a second component second position relative to the housing, the second component disposed within the space between the first wall and the second wall of the first component, the second component having an opening extending through the second component;
  a third component movable between a third component first position and a third component second position relative to the housing, the third component extending through the first opening in the first wall, through the opening in the second component, and through the opening in the second wall;
  a shape memory alloy object having a first end attached to the second component and a second end fixed relative to the first component, the shape memory alloy object adapted to expand to a SMA first position and contract to a SMA second position as a function of temperature;
  a first biasing element adapted to bias the second component to the second component first position, the first biasing element disposed between the second component and a first abutment surface on the first component, wherein the first biasing element applies a tensile force to the shape memory alloy object that keeps the shape memory alloy object taut when the shape memory alloy is in both the SMA first position and the SMA second position;
  a second biasing element adapted to bias the third component to the third component first position, the second biasing element is disposed between the third component and a second abutment surface on the first component;

wherein the first component is movable between the first component first position and the first component second position other than by transferring force to the shape memory alloy object; and wherein the shape memory alloy object can contract to the SMA second position when the first component is retained in the first component first position.

16. The shape memory alloy actuated device for engaging a movable object according to claim 1, wherein the first biasing element biases the second component to the second component first position and biases the first component to the first component second position.

17. The shape memory alloy actuated device for engaging a movable object according to claim 2, wherein the first biasing element biases the second component to the second component first position and biases the first component to the first component second position.

18. The shape memory alloy actuated device for engaging a movable object according to claim 3, wherein the first biasing element biases the second component to the second component first position and biases the first component to the first component second position.

19. The shape memory alloy actuated device for engaging a movable object according to claim 6, wherein the first biasing element biases the second component to the second component first position and biases the first component to the first component second position.

20. The shape memory alloy actuated device for engaging a movable object according to claim 1, wherein the first component comprises a latch and the movable object comprises a catch.

* * * * *